(No Model.)
J. B. HOBSON.
PROCESS OF AND APPARATUS FOR OBTAINING BORACIC ACID FROM NATIVE BORATE OF LIME.
No. 289,836. Patented Dec. 11, 1883.
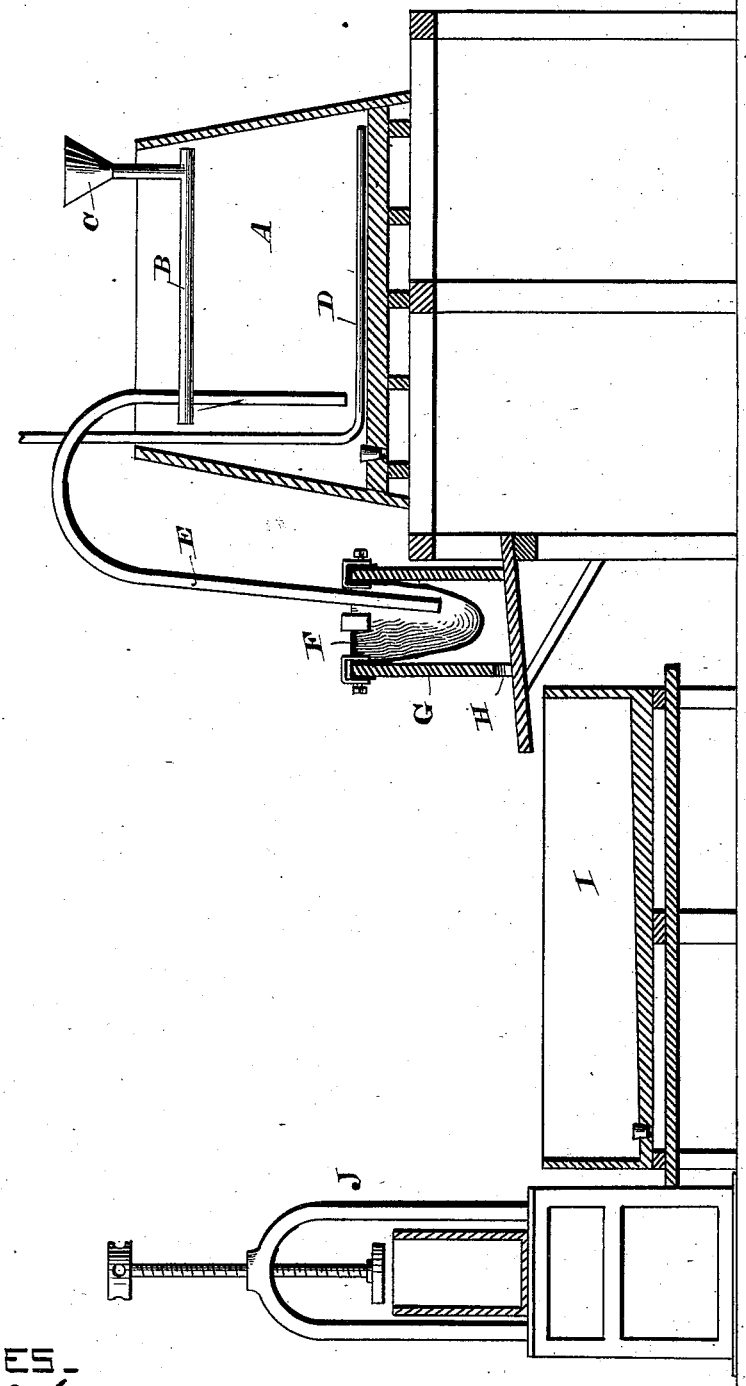

UNITED STATES PATENT OFFICE.

JOHN B. HOBSON, OF SAN FRANCISCO, CALIFORNIA.

PROCESS OF AND APPARATUS FOR OBTAINING BORACIC ACID FROM NATIVE BORATE OF LIME.

SPECIFICATION forming part of Letters Patent No. 289,836, dated December 11, 1883.

Application filed January 19, 1883. (No model.)

*To all whom it may concern:*

Be it known that I, JOHN B. HOBSON, a citizen of the United States, residing at San Francisco, in the county of San Francisco and State of California, have invented a new and useful process of and apparatus for obtaining boracic acid from borate of lime; and I do hereby declare that the following is such a full, clear, and exact description of my invention, as will enable others skilled in the art to which it most nearly appertains to make and use the same.

The object of my invention is to obtain pure, or commercially pure, boracic acid directly from borate of lime; and in order to more fully understand my invention, reference is had to the accompanying drawing, which represents in sectional side elevation a view of the apparatus employed in carrying out my process.

My apparatus consists of a wooden tank, A, lined with lead and mounted upon a suitable base. Within the tank is a perforated lead pipe, B, upheld by suitable lugs which extend upward at a right angle above the top of the tank, and to which is connected a funnel, C, through which the acid employed in the process is fed to the tank. A perforated coil of pipe, D, is also placed in the tank, through which steam is admitted to the contents, to be hereinafter more fully described. From the tank extends a siphon, E, through which the contents of the tank are drawn off into a suitable filtering-bag, F, the latter being connected to the upright vat or box G by clamps, as shown. An opening, H, is made in the bottom of the vat, through which the product of filtration passes into the lead-lined settling-tank I, which is provided with a bottom that inclines outwardly or to the lower end, as shown. At the lower end of the tank or vat I is placed a press, J, by means of which the product is subjected to hydraulic or other pressure, to be hereinafter more fully described.

In carrying out my process, I employ five hundred pounds of borate of lime, which, together with two hundred and fifty gallons of water, is placed in the tank A. Steam is then admitted through the perforated coil D, and the contents of the tank kept agitated by boiling for the space of thirty minutes, by which means the borate of lime is disintegrated, and when so treated can be more readily acted upon and decomposed. Sulphuric acid is now added gradually to the mixture, through the medium of the funnel and perforated coil B C, until forty pounds of sulphuric ($SO_3$) or its equivalent of hydrosulphuric ($HOSO_3$) have been incorporated for each twenty-eight pounds of oxide of lime (CaO) present in the borate of lime after the addition of the $SO_3$. Care should, however, be taken to avoid the introduction of an excess of $SO_3$, as this would decompose the chlorides and liberate chlorine, which would materially affect the quality of the product. The boiling is continued for the space of thirty minutes, when the borate of lime will be thoroughly decomposed, the sulphuric acid ($SO_3$) combining with the lime, (CaO,) forming an insoluble salt of sulphate of lime, ($CaO,SO_3$.) The boracic acid, ($BO_3$,) being liberated, is taken up by the water and forms hydrated boracic acid, ($HO,BO_3+Aq$.) The boiling is now allowed to cease, and the sulphate of lime ($CaO,SO_3$) and earthy matter allowed to settle, when the clear liquor is drawn off by the siphon E and passed through the filter F into the lead-lined vat I, and the residue washed with an addition of boiling water, to remove the remaining boracic acid, and again settled and drawn off as before into the vat I, when the remainder or residue is washed out of the tank A, which is again charged for the next or succeeding operation. When the temperature of the liquor in the vat I falls to 80° Fahrenheit, the boracic acid will crystallize out and settle on the bottom of the vat, and the mother-liquor, containing about six per cent. of boracic acid, is drawn into a tank or receptacle for future use, or when needed in the tank A for the next operation. The boracic acid is now removed from the vat I and placed in canvas bags and removed to the press J, where it is subjected to hydraulic or other pressure, which entirely removes the remaining mother-liquor, which contains the soluble sulphates, chlorides, and nitrates, leaving the slabs of boracic acid perfectly dry and commercially pure.

It should here be observed that the apparatus can be duplicated and the operation made continuous. By this application of pressure I remove in one operation all the impurities usually found associated with the native borate of lime—such as the sulphates of iron, manganese, magnesia, lime, and alumina; also, the alkaline chlorides and nitrates, leaving the boracic acid in such a state of purity as to permit of its use in the arts and manufactures for enameling, glazing, &c., without the necessity of treating the product with soda and hydrochloric acid—a step which is now so common before using the ordinary borax of commerce.

Having thus described my invention, what I claim, and desire to secure by Letters Patent, is—

1. The herein-described process of obtaining boracic acid, consisting in boiling borate of lime with water, gradually adding sulphuric acid, drawing off the separated boracic acid in solution, and filtering and pressing the impure solution of boracic acid to expel its impurities and form the product into cakes and slabs, substantially as described.

2. In an apparatus for obtaining boracic acid, the combination of the tank A, acid-feeding pipe B, having a funnel, C, the perforated steam-pipe D, siphon E, filter F, and settling-tank I, substantially as shown and described.

In testimony that I claim the foregoing I have hereunto set my hand and seal.

JOHN B. HOBSON. [L. S.]

Witnesses:
C. W. M. SMITH,
J. H. BLOOD.